United States Patent [19]

Tredway

[11] Patent Number: 5,118,560
[45] Date of Patent: Jun. 2, 1992

[54] DISCONTINUOUS CARBON FIBER REINFORCED GLASS MATRIX COMPOSITES WITH SECONDARY MATRIX REINFORCEMENT

[75] Inventor: William K. Tredway, Manchester, Conn.

[73] Assignee: United Technologies Corporation, Hartford, Conn.

[21] Appl. No.: 662,649

[22] Filed: Mar. 1, 1991

[51] Int. Cl.$^5$ .............. B32B 33/00; B32B 17/12
[52] U.S. Cl. .................. 428/288; 428/224; 428/266; 428/391; 428/384; 428/427; 428/429; 428/408
[58] Field of Search ........... 428/288, 224, 266, 391; 501/88, 98, 90, 96

[56] References Cited

U.S. PATENT DOCUMENTS

| | | | |
|---|---|---|---|
| 4,314,852 | 2/1982 | Brennan et al. | 501/88 |
| 4,324,843 | 4/1982 | Brennan et al. | 428/697 |
| 4,428,763 | 1/1984 | Layden | 65/4.21 |
| 4,464,192 | 8/1984 | Layden et al. | 65/18.1 |
| 4,511,663 | 4/1985 | Taylor | 501/4 |
| 4,780,432 | 10/1988 | Minford et al. | 501/32 |
| 4,919,991 | 4/1990 | Gadkaree | 428/113 |
| 4,971,779 | 11/1990 | Paine, Jr. et al. | 501/96 |
| 5,023,214 | 6/1991 | Matsumoto et al. | 501/96 |

FOREIGN PATENT DOCUMENTS

| | | |
|---|---|---|
| 62-28411 | 2/1987 | Japan. |
| 62-28412 | 2/1987 | Japan. |
| 62-20786 | 12/1987 | Japan. |

OTHER PUBLICATIONS

H. Hannache, et al., Composite materials made from a porous 2D-carbon-carbon preform densified with boron nitride by chemical vapor infiltration, vol. 19, No. 1, pp. 202-212 (1984).

K. Faher, et al., Crack deflection Processes-I Theory, vol. 31, No. 4, pp. 565-576 (1983).

Primary Examiner—George F. Lesmes
Assistant Examiner—Richard Weisheiger
Attorney, Agent, or Firm—George J. Romanik

[57] ABSTRACT

A discontinuous carbon fiber reinforced glass matrix composite includes a glass matrix, a plurality of carbon reinforcing fibers dispersed in the matrix, and a plurality of boron nitride reinforcing particles dispersed in the matrix. The composite may be fabricated by mixing glass powder and boron nitride reinforcing particles in a carrier liquid to create a slurry and adding a binder to the slurry. A continuous multifilament carbon fiber yarn is impregnated with the slurry and dried to remove the carrier liquid. The impregnated carbon fiber yarn is cut to a suitable length and is molded in a suitable molding means to form a carbon fiber reinforced glass matrix composite article.

8 Claims, 1 Drawing Sheet

5 μm

DISCONTINUOUS CARBON FIBER REINFORCED GLASS MATRIX COMPOSITES WITH SECONDARY MATRIX REINFORCEMENT

DESCRIPTION

1. Cross-Reference to Related Application

This application is related to commonly assigned U.S. Application Ser. No. 07,662,652 filed on even date herewith entitled, "Continuous Carbon Fiber Reinforced Glass Matrix Composites With Secondary Matrix Reinforcement."

2. Technical Field

This invention relates generally to carbon fiber reinforced glass matrix composites and particularly to glass matrix composites reinforced with discontinuous carbon fibers.

3. Background Art

The use of carbon fiber reinforced glass matrix composites (CFRGM composites) as replacements for metal has become common in services requiring high strength, stiffness, and light weight. Products in which such composites have been used range from sporting goods to jet engines.

CFRGM composites typically comprise a glass or glass-ceramic matrix in which carbon fibers are imbedded. The carbon reinforcing fibers may be either continuous or discontinuous depending on the desired application. Continuous fibers generally extend for the entire length of a composite article, while discontinuous fibers, which are significantly shorter than continuous fibers, tend to provide more localized matrix reinforcement. As a result, continuous fiber CFRGM composites are often used for load bearing structural applications, while discontinuous fiber CFRGM composites are more suitable for nonload or low load bearing nonstructural applications, especially those in which parts must be fabricated into complex shapes. Such composites are described in commonly assigned U.S. Pat. No. 4,314,852 to Brennan et al. and U.S. Pat. No. 4,324,843 to Brennan et al. Articles made from carbon fiber reinforced composites may be formed in several ways, including by hot pressing in a shaped die as taught in commonly assigned U.S. Pat. No. 4,314,852 to Brennan et al.; by transfer molding as taught in commonly assigned U.S. Pat. No. 4,428,763 to Layden; or by injection molding as taught in commonly assigned U.S. Pat. No. 4,464,192 to Layden et al. and U.S. Pat. No. 4,780,432 to Minford et al.

The interaction between the carbon fibers and matrix material is responsible for the superior properties displayed by CFRGM composites. The fibers contribute to the composite's strength and elastic modulus by absorbing loads transferred from the matrix through fiber-matrix interfacial bonds. The fibers improve the composite's toughness by inhibiting or blunting the formation of cracks in the matrix. In addition, carbon fibers exposed at the surface of the matrix impart their good lubricating properties to the composite.

Despite their superior physical properties, all CFRGM composites are susceptible to carbon fiber oxidation, particularly when exposed to elevated temperatures. The problem is exacerbated by the presence of matrix microcracks which form during fabrication as a result of a thermal expansion mismatch between the glass matrix and carbon fibers. Microcracking is especially extensive in discontinuously reinforced composites because of the complex stress states arising from the random three-dimensional arrangement of the fibers. Matrix microcracks provide channels which permit oxygen to penetrate into the matrix, providing the opportunity for carbon fibers in the interior of the matrix to oxidize when exposed to elevated temperatures. Carbon fiber oxidation can quickly destroy the composite's strength and lubricity, making carbon fiber composites unsuitable for certain applications or requiring frequent replacement of parts constructed from these composites.

Accordingly it would be desirable to have a discontinuously reinforced CFRGM composite which resists the effects of oxidation and maintains its strength and lubricity, particularly at high temperatures.

DISCLOSURE OF THE INVENTION

The present invention is directed towards a discontinuously reinforced CFRGM composite which resists the effects of oxidation and maintains its strength and lubricity, particularly at high temperatures.

One aspect of the invention includes a discontinuous carbon fiber reinforced glass matrix composite with a glass matrix, a plurality of carbon reinforcing fibers dispersed in the matrix, and a plurality of boron nitride reinforcing particles dispersed in the matrix.

Another aspect of the invention includes a method of fabricating a discontinuous carbon fiber reinforced glass matrix composite. Glass powder and boron nitride reinforcing particles are mixed in a carrier liquid to create a slurry and a binder is added to the slurry. A continuous multifilament carbon fiber yarn is impregnated with the slurry and dried to remove the carrier liquid. The impregnated carbon fiber yarn is cut to a suitable length and is molded in a suitable molding means to form a discontinuous carbon fiber reinforced glass matrix composite.

Another aspect of the invention includes an article fabricated from the above recited carbon fiber reinforced glass matrix composite.

The foregoing and other features and advantages of the present invention will become more apparent from the following description and accompanying drawing.

BRIEF DESCRIPTION OF DRAWING

The Figure is a scanning electron micrograph which shows the distribution of boron nitride particles in the matrix of a discontinuous CFRGM composite of the present invention.

BEST MODE FOR CARRYING OUT THE INVENTION

The matrix of the present invention may be any glass or glass-ceramic which imparts formability, thermal stability, and abrasion resistance to the composite. Borosilicate glass, high silica content glass, aluminosilicate glass, and mixtures thereof possess these properties. Suitable glass-ceramic materials include lithium aluminosilicate and other conventional glass-ceramics such as aluminosilicate, barium-magnesium aluminosilicate, and combinations thereof.

Borosilicate glass is the preferred matrix material because it is more easily processed than other glass matrix materials and possesses reasonably good thermal stability. Suitable borosilicate glasses, such as Corning Code 7070 and Corning Code 7740, are available from Corning Glass Works (Corning, NY). Corning Code 7070 glass is especially preferred because its lower viscosity characteristics make fabrication of composite articles easier. Corning Code 7070 glass has a tensile modulus of $7.4 \times 10^6$ pounds per square inch (psi), a density of 2.13 grams per cubic centimeter (g/cm³), a coefficient of thermal expansion (CTE) of $32 \times 10^{-7}$ centimeter per centimeter per degree Celsius (cm/cm° C.), an anneal point of 496° C., a softening point of 760° C., and a working point of 1068° C. Corning Code 7740 glass has a tensile modulus of $9.1 \times 10^6$ psi, a density of 2.23 g/cm³, a CTE of $32.5 \times 10^{-7}$ cm/cm° C., and anneal point of 560° C., a softening point of 821° C., and a working point of 1252° C.

The carbon reinforcing fibers may be any carbon fibers, especially those which exhibit a tensile strength greater than about $300 \times 10^3$ psi, a tensile modulus greater than about $35 \times 10^6$ psi, and are stable in an inert atmosphere at temperatures up to about 1400° C. While monofilament fibers may be used, multifilament carbon yarns are preferred. A multifilament carbon yarn with an average filament diameter of about 6 microns ($\mu$m) to about 10 $\mu$m, and particularly about 7 $\mu$m to about 10 $\mu$m is especially preferred. Suitable carbon yarns include HMU™, manufactured by Hercules Corporation (Wilmington, DE); P-100, manufactured by Amoco Performance Products (Ridgefield, CT); and FORCA FT700, manufactured by Tonen Corporation (Tokyo, Japan). The HMU ™ yarn is available with 1000, 3000, 6000, or 12,000 fibers per tow and an average fiber diameter of 8 microns. It has a tensile strength of $400 \times 10^3$ psi, a tensile modulus of $55 \times 10^6$ psi, a CTE of $-7 \times 10^{-7}$ cm/cm° C., and a density of 1.84 g/cm³. The P-100 fiber has a tensile strength of $325 \times 10^3$ psi, a tensile modulus of $105 \times 10^6$ psi, a CTE of $-16 \times 10^{-7}$ cm/cm° C., and a density of 2.16 g/c³. The FT700 yarn has a tensile strength of $500 \times 10^3$ psi, a tensile modulus of $100 \times 10^6$ psi, a CTE of $-1.5 \times 10^{-6}$ cm/cm° C., and a density of 2.14 g/cm³. The HMU ™ fiber is preferred for discontinuously reinforced composites because of its inherently higher failure strain.

Boron nitride (BN) reinforcing particles are suitable for this invention because they resist oxidation and have a CTE less than that of the matrix material. The fact that they do not form significant chemical bonds with the matrix material is of particular importance. Significant chemical bonds means bonds resulting from reaction with the matrix or partial dissolution in the matrix. Particles which form strong bonds with the matrix material are subject to the full stress applied to the matrix and tend to fracture rather than to blunt cracks. The BN reinforcing particles only form weak physical bonds with the matrix material, a property which can be characterized by the fact that BN particles are not significantly wetted by the matrix material. Particles which are significantly wetted by the matrix material tend to form stronger physical or chemical bonds with the matrix material and would probably not be suitable for this invention. Particles of materials other than BN which resist oxidation, have a CTE less than the matrix material, and do not form significant chemical bonds with the matrix material would also be suitable for the practice of the present invention.

BN particles of various shapes, including rods, discs, platelets, or spheres are suitable for use with the present invention. Preferably, the particles will have an aspect ratio of at least 5:1 and will be no more than about one half the diameter of the carbon fibers in any direction. For disc-shaped particles, for example platelets, an aspect ratio of about 5:1 provides a normalized toughening increment of 1.25–1.5. The normalized toughening increment is a theoretical parameter in which 1.0 indicates no matrix toughening, while values greater than 1.0 indicate the relative degree of matrix toughening. Higher aspect ratios would provide even greater normalized toughening increments. Most preferably, the particles will be no more than about 10% to about 40% of the diameter of the carbon fibers in any direction. For best results, the particles should be homogeneously distributed throughout the matrix material. Preferably, the particles will be distributed randomly. BN platelets having a diameter of about 0.5 $\mu$m to about 2.0 $\mu$m diameter and a thickness of about 0.10 $\mu$m or less have been found to be particularly suitable for use in carbon fiber reinforced borosilicate glass composites in which the carbon reinforcing fibers have a diameter of about 7 $\mu$m to about 10 $\mu$m. Such platelets are available from Cerac (Milwaukee, WI) as hexagonal boron nitride, from Union Carbide Advanced Ceramics (Cleveland, OH) as HCP boron nitride, HPF boron nitride or MW-5 boron nitride, from Standard Oil Engineered Materials (Niagra Falls, NY) as Combat® boron nitride, and from ESK Engineered Ceramics (New Canaan, CT) as Type S boron nitride.

A CFRGM composite article containing BN reinforcing particles may be formed in any of the ways known to the art for forming similar composites which do not contain reinforcing particles. Hot pressing and injection molding are the preferred methods. The key difference between the methods taught in the art and the methods required to practice the current invention is the incorporation of reinforcing particles into the CFRGM composite.

The BN reinforcing particles may be incorporated into the CFRGM composite in several ways. For example, the BN particles may be mechanically mixed with prepregged, chopped carbon fibers. The preferred method is to incorporate the reinforcing particles directly into the carbon fiber tow along with the glass powder during the prepregging process. This method results in uniform distribution of the BN reinforcing particles between the prepregged carbon fibers and eliminates any mixing which may result in segregation of the constituents.

First, a slurry of glass powder, BN reinforcing particles, and a carrier liquid should be prepared. The BN reinforcing particles should be well dispersed in the slurry so that they will be homogeneously distributed throughout the matrix of the composite. Preferably, the glass powder will be about $-325$ mesh and the reinforcing particles will be about 1 $\mu$m in diameter. The preferred carrier is water, although any liquid compatible with the binder to be added in the next step may be used. Appropriate amounts of glass powder and BN particles are added to an appropriate amount of carrier. While the amount of materials in the slurry may vary, the amount of glass added should be adequate to give about 15 volume percent (vol %) to about 40 vol % fibers and about 10 vol % to about 25 vol % reinforcing particles when the carrier liquid and binder are removed. The final molded article generally contains about 40 vol % to about 75 vol % glass matrix. The preferred amount of glass and BN particles will depend on the particular application. The resulting mixture is shaken vigorously for a few minutes to initially disperse the glass powder and BN particles in the carrier. Shaking alone, however, is insufficient to adequately disperse the BN particles because they tend to agglomerate due to their shape and extremely small size. Therefore, after initially dispersing the glass powder and BN particles by shaking, the glass powder/BN particle/carrier mixture should be milled. Preferably, the mixture will be milled with an ultrasonic mixer for about 15 minutes or until it is evident that any BN agglomerates are broken up and uniformly dispersed in the slurry. A Model VT600 Vibra-Cell high intensity ultrasonic processor, available from Sonics & Materials (Danbury, CT), is a suitable ultrasonic mixer. Operating the mill at 70% power and a 50% duty cycle (on-off cycle of 1:1) has been found to be particularly effective.

After the glass powder/BN particle/carrier slurry has been milled, a binder should be added to hold the glass powder and BN particles in place within the fiber tow during subsequent cutting or chopping operations. The binder should not be added before milling because this would cause excessive foaming of the mixture. The binder may be any of the binders customarily used to prepreg carbon fibers. For example, the binder may be a polymeric binder which dissolves or disperses readily in the carrier. Preferred polymeric binders include latex acrylic type polymers, such as Rhoplex TM latex-acrylic which is available from Rohm & Haas Corporation (Philadelphia, PA), and the Carbowax TM series of polymers, such as Carbowax 4000 which is available from Union Carbide Corporation (Danbury, CT). Alternately, the binder may be an inorganic binder which dissolves or disperses readily in the carrier. Preferred inorganic binders include colloidal silica solutions, such as Ludox TM which is available from E.I. DuPont de Nemours (Wilmington, DE).

Once the glass powder/BN particle/carrier/ binder slurry has been prepared, carbon fiber tows are drawn through the slurry in such a way that the slurry saturates the fiber tow. When the proper proportions of the slurry constituents are employed, the fiber tows will be impregnated with an amount of glass sufficient to bring the volume fraction of glass into the desired 40 vol % to 75 vol % range. The impregnated tows are then wound onto a mandrel and dried.

The dried tows are chopped to a length useful with the intended molding process. For example, if the fibers are to be used in an injection molding process, they should be cut short enough to prevent clumping when passing through an orifice into a mold. Preferably, fibers used for injection molding will be about 0.635 cm to about 1.27 cm in length. Finally, the impregnated tows are formed into desired articles by any of the methods known to the art for forming CFRGM composites.

EXAMPLE 298 meters of HMU TM Magnamite TM graphite fibers (Hercules Incorporated, Wilmington, DE), having 3000 filaments per tow and a weight of 65 grams were impregnated with a glass powder/BN particle/water/binder slurry by unrolling the fiber yarn from a feed spool, removing the fiber sizing by passing the yarn through the flame of a bunsen burner at moderate speed, about 6.5 meters/min, immersing the yarn in an agitated slurry, and winding the saturated yarn on a take-up mandrel. The slurry consisted of 300 grams of −325 mesh Corning Code 7070 borosilicate glass powder (Corning Glass Works, Corning, NY), 100 grams of hexagonal boron nitride platelets (Cerac, Milwaukee, WI), 50 grams of Ludox TM colloidal silica binder (E.I. DuPont de Nemours, Wilmington, DE),and 600 ml of distilled water. Sufficient slurry impregnated the yarn to add 259 grams of glass powder and 87 grams of boron nitride. The saturated yarn was dried on the take-up mandrel to remove the water.

After drying, the impregnated yarn was removed from the take-up mandrel and cut to an average tow length of 1.25 cm. The chopped prepregged fibers, known as molding compound, were placed in the reservoir chamber of an injection molding apparatus which had an injection port with a width of 0.51 cm and a length of 7.5 cm. The injection molding apparatus was placed in a vacuum hot press and heated to 1275° C. A load calculated to apply 7 MPa to the plunger was applied and maintained for 30 minutes. Furnace power was shut off and the assembly cooled to 500° C. at which point the pressure was removed. The assembly was cooled to room temperature and the injection molded part was removed from the mold.

The Figure, a scanning electron micrograph, shows well distributed BN platelets in a discontinuous CFRGM composite made according to the Example. The platelets appear as small white particles dispersed among the much larger carbon fibers. The BN platelets are homogeneously distributed throughout the matrix, including between individual carbon fibers, and are random in their spatial orientation, as opposed to being aligned or preferentially oriented. The majority of the platelets exist as discrete particles, rather than in large agglomerations of several platelets. A BN particle distribution similar to that shown in the Figure is preferred because it provides a more uniform material with very few matrix-rich regions which are not reinforced by either carbon fibers or reinforcing particles. As a result, the composite has a tougher matrix which demonstrates improved oxidative stability. While the BN particle distribution shown in the Figure is preferred, other particle distributions, such as a less random, more agglomerated distribution would also provide some of the benefits of this invention.

TABLE

|  | Conventional Composite | Composite + BN |
|---|---|---|
| Apparent Porosity As-pressed (%) | 0.60 | 0.18 |
| Normalized Ave. Weight Loss After Oxidation (mg/cm$^2$) | 32.44 | 8.76 |
| Average Flexural Strength As-pressed (ksi) | 19.1 | 26.5 |
| After Oxidation (ksi) | 5.5 | 23.0 |
| Coefficient of Friction As-pressed | 0.273 | 0.174 |

The Table compares properties of a sample of a conventional CFRGM composite which does not have BN reinforcing particles (Conventional Composite) with those of a similar CFRGM composite with about 17 vol % BN platelets made according to the Example (Composite+BN). Both composites had a Corning Code 7070 glass matrix and about 25 vol % carbon fibers. The apparent porosity, which is a measure of the sample's surface-connected porosity resulting from matrix microcracking, is a good indicator of the relative volume available to transport oxygen to the interior of the composite because surface cracks tend to link up with interior microcracks. As shown in the Table, the CFRGM composite which contained BN platelets had an apparent porosity of less than one third that of the conventional CFRGM composite. As a result, the composite containing BN platelets would be expected to display much better oxidative stability than the conventional composite.

The figures reported for normalized average weight loss and flexural strength demonstrate the improved oxidative stability of the CFRGM composite containing BN platelets over the conventional CFRGM composite. Both composites were exposed to flowing oxygen at 800° F. and atmospheric pressure for 500 hours. Weight loss, which is due primarily to the oxidation of carbon fibers, is indicative of the extent of fiber loss. The lower weight loss in the composite containing BN is due to the less extensive microcracking in the composite's matrix. As to be expected from a lower oxidation rate, the composite containing BN retained much more of its flexural strength than did the composite which did not contain BN. Also of interest is the fact that the composite containing BN had a higher as-pressed, that is, not oxidized, flexural strength than the conventional composite. The superior strength results from the presence of BN in the matrix, which provides additional reinforcement to the composite.

The coefficient of friction data show that a CFRGM composite containing BN platelets displays improved lubricity over a conventional CFRGM composite. These data were obtained at room temperature on a Rheometrics Model RDS II rheometer by contacting as-pressed composites against an Inconel 718 counterface at various rotational rates and loadings. Data were taken under both dynamic (oscillatory) and steady-state (gliding) conditions. The reported coefficients of friction are an average of the data at each rotational rate. The conventional composite's low coefficient of friction is due to carbon reinforcing fibers, which are known to have good lubricating properties, exposed on the composite's surface. Like the carbon reinforcing fibers, BN has a graphitic crystal structure which also gives it good lubricating properties. As a result, the addition of BN to the CFRGM composite results in a composite with improved as-pressed lubricity. The BN-containing CFRGM composite should display an even more significant improvement in lubricity over the conventional CFRGM composite after the composites are oxidized. Oxidation will destroy a significant number of the surface-exposed carbon fibers in the conventional composite, resulting in a substantial loss in lubricity. On the other hand, the BN containing composite will retain more of its carbon fibers, and therefore, lose less of the lubricity attributable to the fibers. Moreover, because BN oxidizes at least 100 times slower than carbon fibers, almost all of the lubricity attributable to the BN should be retained.

As can be seen from the data in the Table, the addition of BN particles to a CFRGM composite improves the composite's properties in at least two ways. First, the BN particles themselves act as a secondary reinforcing and lubricating phase. Second, the BN particles reduce the effects of carbon fiber oxidation by suppressing the formation of microcracks in the matrix. One way in which the BN particles suppress microcracks is by blunting the microcracks as they form, thereby toughening the matrix and preventing the development of extensive channels by which oxygen penetrates to the carbon reinforcing fibers. Another way in which BN particles suppress microcracking is by reducing the thermal mismatch between the "matrix" and the carbon fibers, where the "matrix" is considered to be the combination of the glass and the BN particles. In effect, the BN particles, which have a lower CTE than the glass, decrease the overall CTE of the "matrix". Because there is less of a thermal expansion mismatch between the "matrix" and the carbon fibers, fewer microcracks form due to thermal stresses.

An article fabricated from a discontinuously reinforced CFRGM composite containing BN particles will display improved oxidative stability, lubricity, matrix toughness, strength, stiffness, and machinability over similar CFRGM composites which do not contain BN particles. A person skilled in the art would be able to identify many uses of a composite of the present invention.

It should be understood that the invention is not limited to the particular embodiment shown and described herein, but that various changes and modifications may be made without departing from the spirit or scope of the claimed invention.

I claim:

1. A discontinuous carbon fiber reinforced glass matrix composite comprising a glass matrix, a plurality of discontinuous carbon reinforcing fibers, and a plurality of boron nitride reinforcing particles dispersed in the matrix.

2. The discontinuous carbon fiber reinforced glass matrix composite of claim 1 wherein the glass matrix comprises a borosilicate glass.

3. The discontinuous carbon fiber reinforced glass matrix composite of claim 1 wherein the boron nitride reinforcing particles have an aspect ratio of at least 5:1.

4. The discontinuous carbon fiber reinforced glass matrix composite of claim 1 comprising about 10 volume percent to about 25 volume percent boron nitride particles.

5. A discontinuous carbon fiber reinforced glass matrix composite article made according to the method comprising the steps of:
   (a) mixing a glass powder and boron nitride reinforcing particles in a carrier liquid to create a slurry;
   (b) adding a binder to the slurry;
   (c) impregnating a continuous multifilament carbon fiber yarn with the slurry;
   (d) drying the impregnated carbon fiber yarn to remove the carrier liquid;
   (e) cutting the impregnated carbon fiber yarn to a suitable length; and
   (f) molding the impregnated carbon fiber yarn in a suitable molding means to form a discontinuous carbon fiber reinforced glass matrix composite.

6. The article of claim 5 wherein the glass powder comprises a borosilicate glass.

7. The article of claim 5 wherein the boron nitride reinforcing particles have an aspect ratio of at least 5:1.

8. The article of claim 5 wherein sufficient quantities of boron nitride particles, carbon fiber reinforcing fibers, and glass powder are used to produce a composite with about 10 volume percent to about 25 volume percent boron nitride particles.

* * * * *